United States Patent
Takahashi et al.

(10) Patent No.: US 7,298,283 B2
(45) Date of Patent: Nov. 20, 2007

(54) DEVICE FOR DETECTING LINE-DISCONNECTION IN STEPPING MOTOR DRIVER

(75) Inventors: Kazuhiro Takahashi, Niiza (JP); Hiroshi Domon, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 182 days.

(21) Appl. No.: 11/178,030

(22) Filed: Jul. 8, 2005

(65) Prior Publication Data
US 2006/0022837 A1   Feb. 2, 2006

(30) Foreign Application Priority Data
Jul. 9, 2004   (JP) .............................. 2004-203697

(51) Int. Cl.
*G08B 21/00*   (2006.01)
(52) U.S. Cl. .................. 340/679; 340/660; 340/661; 340/664; 340/691.8; 318/696; 318/794
(58) Field of Classification Search ................ 340/679, 340/660, 661, 664, 691.8; 318/696, 794
See application file for complete search history.

(56) References Cited

U.S. PATENT DOCUMENTS 5,656,910 A  *  8/1997  Erckert ........................ 318/685
5,786,641 A  *  7/1998  Nakanishi et al. ............ 307/64

* cited by examiner

*Primary Examiner*—Tai Nguyen
(74) *Attorney, Agent, or Firm*—Bachman & LaPointe, P.C.

(57) ABSTRACT

A device for detecting disconnection for use in a stepping motor driver is provided having a driver circuit 3 which comprises a pair of windings 21, 22 wound in a bifilar turn arrangement; a pair of MOSFETs 1, 2 connected to the other end of each winding 21, 22; a common current detecting resistor 4 connected between MOSFETs 1, 2 and ground; a first reference voltage generator 34 for producing a first reference voltage $V_{t1}$; a second reference voltage generator 40 for producing a second reference voltage $V_{t2}$ lower than first reference voltage $V_{t1}$; a decision circuit 8, 8b for comparing the detection voltage on current detecting resistor 4 with second reference voltage $V_{t2}$ to produce an alarm signal when detection voltage is higher than second reference voltage $V_{t2}$; and a disconnection detector 11 for receiving an alarm signal from decision circuit 8, 8b after comparator 8 produces a chopper signal 17 to produce a disconnection signal upon occurrence of line-disconnection in winding 21 or 22.

10 Claims, 13 Drawing Sheets

DEVICE FOR DETECTING LINE-DISCONNECTION IN STEPPING MOTOR DRIVER

TECHNICAL FIELD

This invention relates to a device for detecting line or wire disconnection in a stepping motor driver which has a driver circuit preferably formed into a simplified integrated circuit and capable of detecting disconnection or break in a winding.

BACKGROUND OF THE INVENTION

For example, Japanese Patent No. 2,639,144 discloses an apparatus for controlling an exhaust gas return valve which comprises a line-disconnection detecting circuit for use in a stepping motor. The control apparatus discerns a specific level of excitation current flowing through to windings of the stepping motor to detect disconnection in winding based on the discerned level of the excitation current.

FIG. 12 shows an electric circuit diagram of a prior art disconnection detecting circuit 100 used in a control apparatus for an exhaust gas return valve. Disconnection detecting circuit 100 comprises excitation coils 121 to 124 provided in a stepping motor 120 and each having one end connected to a DC power source 130 through a resistor 137 or 138; four transistors 101 to 104 each having a collector terminal connected to the other end of excitation coil 121 to 124; current detecting resistors 105 to 108 each connected to an emitter terminal of transistor 101 to 104; four comparators 109 to 112 each having a non-inverted input terminal (+) connected to a junction between each emitter terminal of transistor 101 to 104 and current detecting resistor 105 to 108, and an inverted input terminal connected between two voltage-dividing resistors 131 and 132; four D-type flip flops (DFF) 125 to 128 each having a D input terminal connected to an output terminal of corresponding comparator 109 to 112; a motor drive circuit 140 for simultaneously supplying drive pulses for a base terminal of each transistor 101 to 104 and a trigger input terminal T of each DFF 125 to 128 through a retardant circuit 133 to 136; an AND gate 141 for receiving outputs from all of DFFs 125 to 128; and a control circuit 142 having an input terminal $P_i$ for receiving an output from AND gate 141 and an output terminal $P_o$ for forwarding drive signals to motor drive circuit 140.

In operation, control circuit 142 produces drive signals to motor drive circuit 140 which then provides drive signals of four different phases at 90 degree angular intervals for base terminal of transistors 101 to 104 to turn them on and off to drive stepping motor 120. For example, upon turning transistor 100 on, electric current flows from DC power source 130 through resistor 137, excitation coil 121, collector-emitter terminals of transistor 101 and current detecting resistor 105 to ground to activate stepping motor 120. At the same time, drive signals from motor drive circuit 140 are transmitted to trigger input terminal T of DFF 125 with a constant delay time through retardant circuit 133. Dividing resistors 131 and 132 provide a reference voltage for each inverted input terminal of comparators 109 to 112.

In operating stepping motor 120, output signals from output terminal $P_o$ of control circuit 142 cause motor drive circuit 140 to produce drive pulses to base terminal of transistor 101 to turn it on so that electric current flows from DC power source 130 through excitation coil 121, transistor 101 and current detecting resistor 105. Electric current through excitation coil 121 and transistor 101 is detected as a corresponding detection voltage applied on current detecting resistor 105, and comparator 109 compares detection voltage on current detecting resistor 105 with reference voltage divided by resistors 131 and 132. When detection voltage on current detecting resistor 105 reaches a predetermined level, comparator 109 produces the output to make DFF 125 produce the output of high voltage level to AND gate 141. Similar operations are carried out in case motor drive circuit 140 produces drive pulses to each base terminal of remaining transistors 102 to 104, and when detection voltage on current detecting resistors 106 to 108 comes up to the predetermined level, comparators 110 to 112 produce the outputs so as to transmit the outputs of high voltage level from DFF 126 to 128 to AND gate 141.

Upon occurrence of disconnection in excitation coil 123, no electric current flows through excitation coil 123 although motor drive circuit 140 gives base terminal of transistor 103 drive pulse, and therefore, there is no detection voltage on current detecting resistor 107. This causes DFF 127 to produce the output of low voltage level to transmit a disconnection signal to input terminal $P_i$ of control circuit 142 through AND gate 141.

Japanese Patent Disclosure Nos. 2000-175486 and 2-26297 demonstrate stepping motors capable of detecting disconnection in motor coil by detecting an elevated voltage applied on a driving element when any disconnection occurs in motor coil of the bifilar turn arrangement in the stepping motor. FIG. 13 shows a disconnection detecting circuit of such a stepping motor.

As shown in FIG. 13, the disconnection detecting circuit comprises two pairs of motor coils or windings 221 to 224 each pair being wound in the bifilar turn arrangement, field effect transistors (FETs) 201 to 204 each connected in series to DC power source 230 and winding 221 to 224, a common current detecting resistor 205 connected between FETs 201 and 202 and ground, a diode 206 connected in parallel to current detecting resistor 205, a common current detecting resistor 207 connected between FETs 203 and 204 and ground, a diode 208 connected in parallel to current detecting resistor 207, a disconnection detecting circuit 240 connected between each winding 221 to 224 and FET 201 to 204, first and second control circuits 210 and 211 for forwarding drive signals to gate terminal of each FET 201 to 204, an excitation signal generator 212 for applying excitation signals to first and second control circuits 210 and 211, and a stop controller 250 for receiving a disconnection signal detected by disconnection detecting circuit 240 to provide stop control signals for first and second control circuits 210 and 211. Disconnection detecting circuit 240 comprises diodes 241 to 244 connected between winding 221 to 224 and FET 201 to 204, a common Zener diode 245 connected to all diodes 241 to 244, resistors 246 and 247 for dividing output from Zener diode 245, and a capacitor 248 connected in parallel to resistor 247. Stop controller 250 has an input terminal connected between resistors 246 and 247.

When no break appears in each winding 221 to 224, stop controller 250 does not produce the output. For example, when winding 221 has a break or cutoff, accumulated electric energy in winding 222 in the bifilar turn arrangement together with winding 221 cannot be released through winding 221, and therefore, high voltage induced in winding 222 causes breakdown of FET 202. Subsequently, electric energy in winding 222 is discharged while electric current flows through a closed circuit including winding 222, FET 202, resistor 205 and DC power source 230. This electric current causes Zener diode 245 to be turned on to provide a trigger signal of high voltage level for stop controller 250.

Accordingly, stop controller 250 forwards stop signals to first and second control circuits 210 and 211 to cease operation of FETs 201 to 204.

As mentioned above, prior art disconnection detecting devices require complicated circuit construction and high voltage resistive electric elements to detect disconnection in winding of two phase stepping motor provided with plural windings in the bifilar turn arrangement. Such a circuit construction is expensive in manufacture and also unsuitable to produce an integrated circuit of the disconnection detector. In addition, when two phase stepping motor is operated with unipolar drive, switching elements are on-off switched by a chopper drive of regular current. In this case, if electric energy is accumulated in one winding, and besides, the other winding has a disconnection, counter electromotive force resulted from flyback energy cannot be regenerated through the other disconnected winding, and therefore, an excessive electric potential would be applied to a switching element for excitation of one winding. Thus, there is a large risk that the excessive electric potential may cause damage such as breakdown to the switching element. In this way, any of prior art techniques cannot detect disconnection in winding until the timing to excite the disconnected winding.

An object of the present invention is to provide a device having a simplified circuit structure for detecting disconnection of a stepping motor. Another object of the present invention is to provide a device for detecting disconnection of stepping motor and capable of easily producing the device into an integrated circuit.

SUMMARY OF THE INVENTION

The device for detecting disconnection according to the present invention, is used with a stepping motor driver which comprises at least a pair of windings (21, 22) wound in a bifilar turn arrangement and having each one end connected to a DC power source (20); a pair of switching elements (1, 2) connected to the other end of each winding (21, 22); a common current detecting resistor (4) connected between each switching element (1, 2) and ground, a drive circuit (10) for forwarding drive signals to each control terminal of the switching elements (1, 2); a control circuit (12) for supplying the drive circuit (10) with operation signals; a PWM circuit (14) for providing the drive circuit (10) with pulse width modulated signals; a first reference voltage generator (34) for producing a first reference voltage ($V_{r1}$); and a comparator (8) for comparing a detection voltage applied on the current detecting resistor (4) with the first reference voltage ($V_{r1}$) to provide the PWM circuit (14) with a chopper signal (17) for turning off the switching element (1, 2) in the on condition when the detection voltage is higher than the first reference voltage ($V_{r1}$). The device comprises a second reference voltage generator (40) for producing a second reference voltage ($V_{r2}$) lower than the first reference voltage ($V_{r1}$); a decision circuit (8, 8*b*) for comparing the detection voltage on the current detecting resistor (4) with the second reference voltage ($V_{r2}$) to produce an alarm signal when the detection voltage is higher than the second reference voltage ($V_{r2}$); and a disconnection detector (11) for receiving the alarm signal from the decision circuit (8, 8*b*) after the comparator (8) produces the chopper signal (17) to produce a disconnection signal when the decision circuit (8, 8*b*) continues to produce the alarm signal even after the switching element (1, 2) in the on condition is turned off, or when the decision circuit (8, 8*b*) produces the alarm signal over a predetermined period of time or when the accumulated value of the alarm signal exceeds a predetermined value after the switching element (1, 2) in the on condition is turned off.

During the normal operation of the stepping motor driver, when one of switching elements (1, 2) is turned on to cause excitation current ($I_1$) to flow through the corresponding one of windings (21, 22) and thereby accumulate electric energy in the winding (21 or 22). After that, when the switching element (1 or 2) in the on condition is turned off, regenerative current ($I_2$) runs from ground through current detecting resistor (4), parasitic diode (1*a* or 2*a*) of mating switching element (1 or 2), mating winding (21 or 22) in bifilar turn arrangement to DC power source (20) to discharge electric energy accumulated in winding (21 or 22), while regenerative current ($I_2$) produces negative detection voltage on current detecting resistor (4).

If disconnection arises in mating winding (21 or 22), no regenerative current ($I_2$) passes through the mating winding (21 or 22), but instead, accumulated electric energy causes in windings (21, 22) high flyback voltage superimposed on power voltage from DC power source (20) together applied on switching element (1 or 2). When flyback voltage rises to an avalanche breakdown voltage level of the switching element (1 or 2), it is clamped with avalanche voltage, and despite the switching element (1 or 2) kept in the off condition, regenerative current (13) flows from winding (21 or 22) through the switching element (1 or 2), current detecting resistor (4) to ground, thereby inducing positive detection voltage on the current detecting resistor (4). The decision circuit (8, 8*b*) compares the detection voltage on current detecting resistor (4) with the second reference voltage ($V_{r2}$) to produce an alarm signal when the detection voltage is higher than the second reference voltage ($V_{r2}$). The disconnection detector (11) produces a disconnection detection signal when receives the alarm signal from the decision circuit (8, 8*b*) after the switching element (1 or 2) in the on condition is turned off.

In an embodiment, the stepping motor driver according to the present invention, comprises at least a pair of windings (21, 22) wound in a bifilar turn arrangement and having each one end connected to a DC power source (20); a pair of switching elements (1, 2) connected to the other end of each winding (21, 22); a drive circuit (10) for providing control terminals of the switching element (1, 2) with drive signals, and a control circuit (12) for supplying operation signals to the drive circuit (10). The disconnection detecting device in the stepping motor driver comprises a retaining circuit (45) for starting output of alarm signal at the time of forwarding a rising or trailing edge in drive signal to the switching element (1, 2), and a disconnection detecting circuit (46) for producing a disconnection detection signal when the retaining circuit (45) produces the alarm signal over a predetermined amount or continuously over a given period of time. When disconnection arises in any of the windings (21, 22) during the high speed rotation of the stepping motor, the disconnection detecting circuit (46) produces an alarm signal when the retaining circuit (45) produces an alarm signal over a predetermined amount or continuously over a given period of time after the retaining circuit (45) starts output of alarm signal at the time of forwarding a rising or trailing edge in drive signal to switching element (1, 2).

In accordance with the present invention, when flyback energy produces high voltage upon occurrence of disconnection in winding of the regenerative side, the detecting device can detect the disconnection in the winding of the regenerative side to stop the stepping motor driver once the switching element comes into the avalanche region. As a single avalanche tolerance dose is usually larger than repetitive one, the stepping motor driver can be stopped with the only one application of high voltage to current detecting resistor to advantageously repress damage to the switching elements. This expands selectable ranges of switching elements. Also, the major circuit portion of the stepping motor driver except windings can be formed into an integrated circuit (IC) containable in a similar package as those produced by a prior art technique without need of altering peripheral equipments for enhanced protective function and improvement in reliability.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of the device for detecting disconnection according to the present invention applied to a two-phase stepping motor driver are described hereinafter with reference to FIGS. 1 to 11 of the drawings.

Figure 1:
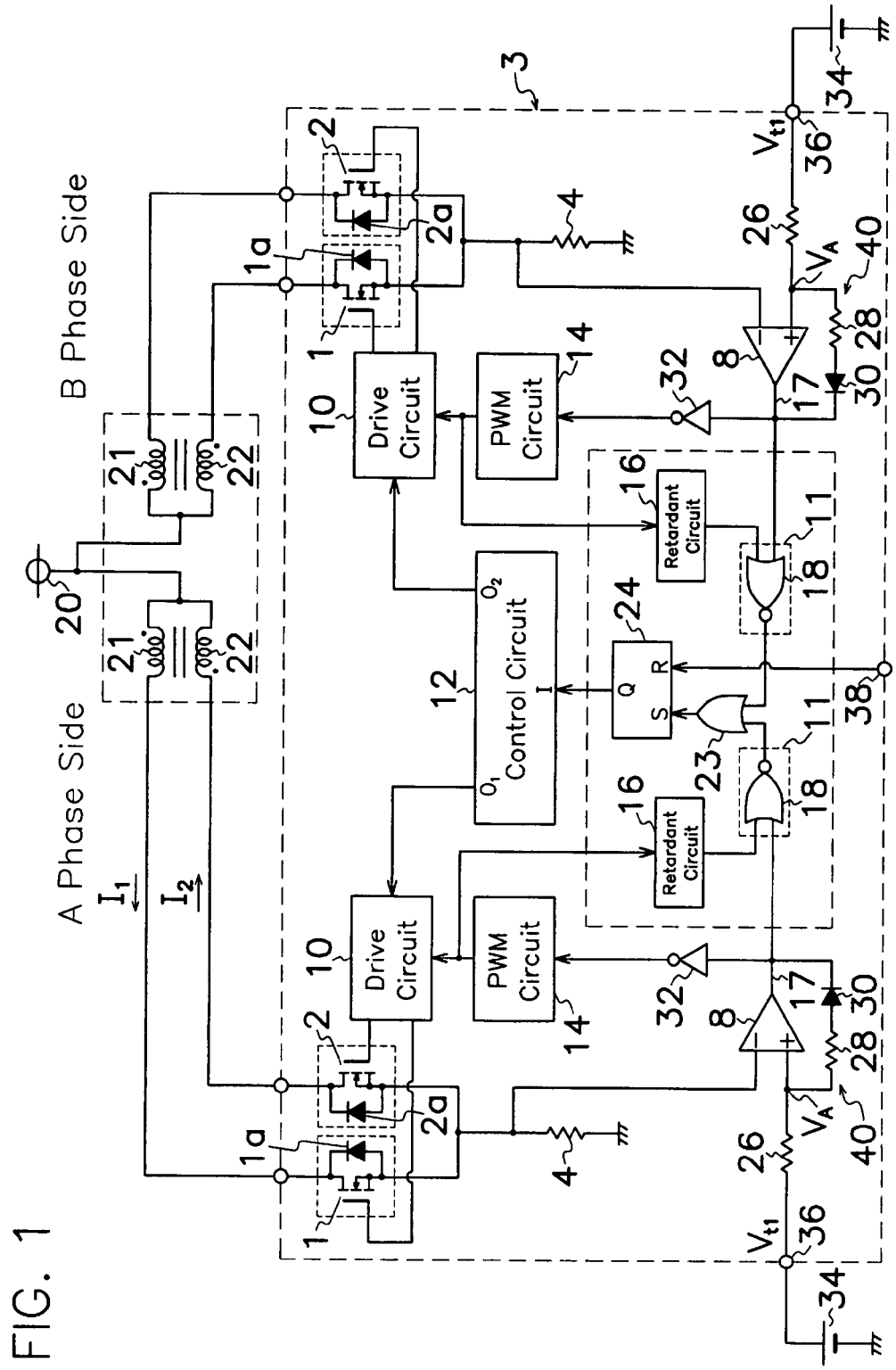
FIG. 1 is an electric circuit diagram showing a first embodiment of a device for detecting disconnection in stepping motor driver according to the present invention.
Figure 2:
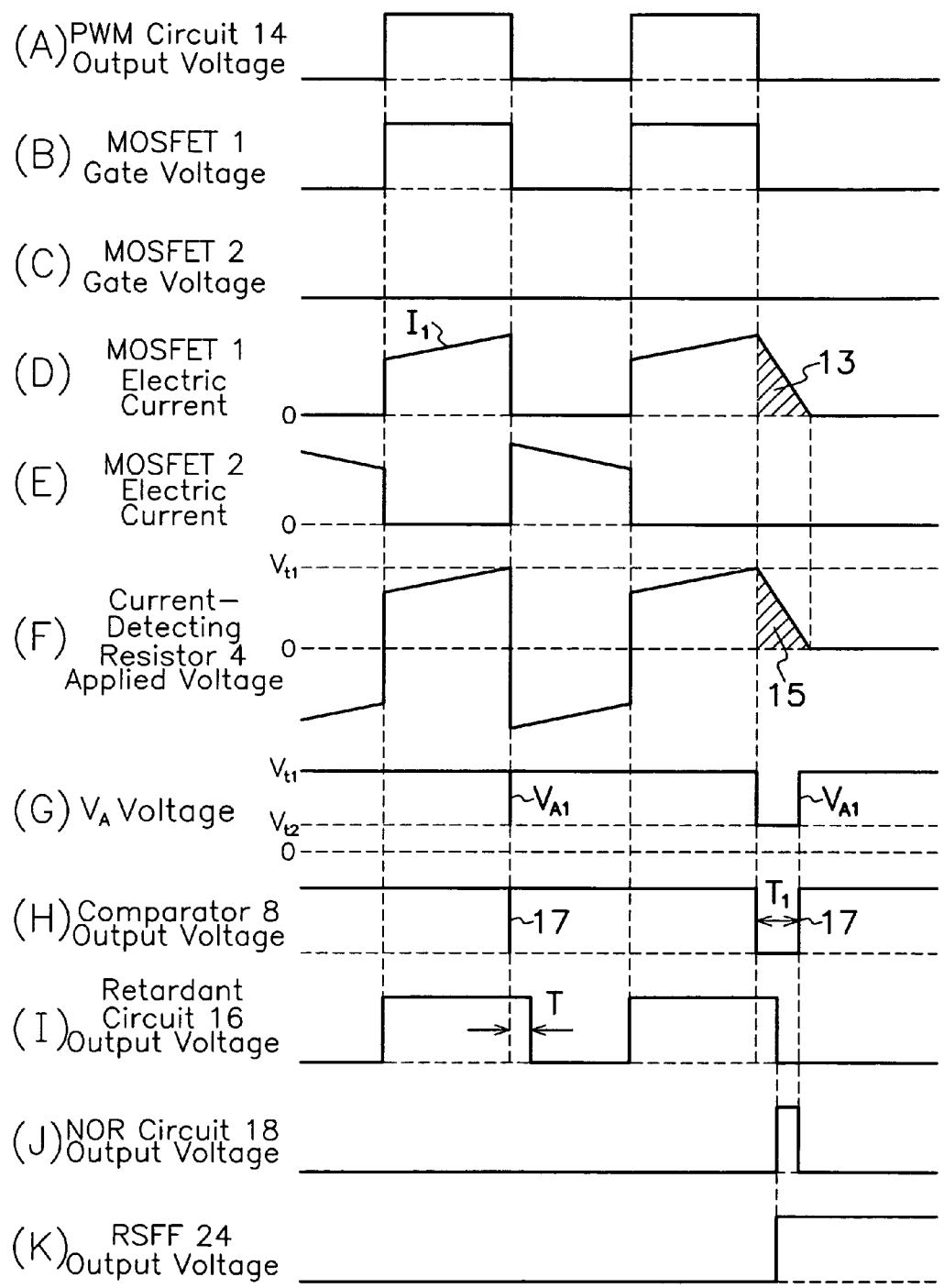
FIG. 2 is a wave form diagram of electric signals produced through circuit electric elements shown in FIG. 1.

In a first embodiment of the invention shown in FIG. 1, the device comprises two pairs of windings 21, 22 wound in a bifilar turn arrangement, whose each one end is connected to a DC power source 20; and a driving circuit 3 which may be formed in an integrated circuit connected to the other end of each winding 21, 22. One and the other pairs of windings 21, 22 form respectively unipolar A and B phase sides of a stepping motor (not shown) so that windings 21, 22 of A and B phase sides are excited in the predetermined order to drive the stepping motor.

Driving circuit 3 comprises metal-oxide semiconductor field effect transistors (MOSFETs) 1 and 2 as a pair of switching elements for each of A and B phase sides, which are connected to the other end of windings 21 and 22; a common current detecting resistor 4 connected between MOSFETs 1 and 2 and ground, a drive circuit 10 for forwarding drive signals to each gate terminal as a control terminal of MOSFETs 1 and 2; a control circuit 12 having a pair of output terminals (distribution/disable terminals) for supplying drive circuit 10 with operation signals; a PWM (Pulse Width Modulation) circuit 14 as a constant current chopper driver for providing drive circuit 10 with pulse-width modulated signals; a first reference voltage generator 34 for producing a first reference voltage $V_{r1}$; and a comparator 8 for comparing a detection voltage applied on current detecting resistor 4 with first reference voltage $V_{r1}$ to provide PWM circuit 14 with a chopper signal 17 shown in FIG. 2(H) to stop operation of drive circuit 10 when detection voltage is higher than first reference voltage $V_{r1}$. Parasitic diodes 1a and 2a are connected in parallel to MOSFETs 1 and 2. Drive circuit 10 may comprise at least any one of various known circuit, for example a drive circuit which includes a gate circuit disclosed in Japanese Patent No. 3,525,436, an IC type control circuit disclosed in Japanese Patent Disclosure No. 2003-111399 or a gated circuit. Also, PWM circuit 14 may comprise a known circuit exhibited in Japanese Patent No. 2,789,096.

The disconnection detecting device of the present invention further comprises inverters 32 each connected between output terminal of comparator 8 and PWM circuit 14; a NOR gates 18 for A and B phase sides as disconnection detectors 11 each connected to output terminal of comparator 8 and output terminal of PWM circuit 14 through a retardant circuit 16; and an RS flip flop (RSFF) 24 having a set terminal S for receiving an output from NOR gate 18 through an OR gate 23. Reset terminal R of RSFF 24 is supplied with a reset signal through a port 38 from a peripheral device out of driving circuit 3, and output terminal of RSFF 24 is connected to an input terminal I of control circuit 12.

Comparator 8 comprises one inverted input terminal (−) connected to current detecting resistor 4, and the other non-inverted terminal (+) connected to a first reference voltage generator 34 through a resistor 26 and port 36. A series circuit of a resistor 28 and diode 30 provides a second reference voltage generator 40 for producing a second reference voltage $V_{r2}$ lower than first reference voltage $V_{r1}$, and resistors 26 and 28 serve to provide a divided voltage of first reference voltage generator 34. In addition, comparator 8 incorporates second reference voltage generator 40 to form a decision circuit which compares detection voltage on current detecting resistor 4 with second reference voltage $V_{r2}$ and produces an alarm signal when detection voltage is higher than second reference voltage $V_{r2}$. NOR gate 18 forms a disconnection detector 11 which receives alarm signal from decision circuit 8 after comparator 8 produces chopper signal 17 to produce a disconnection signal. Comparator 8 normally produces the output of high voltage level, but changes the output to low voltage level when detection voltage on current detecting resistor 4 exceeds first reference voltage $V_{r1}$ of first reference voltage generator 34. Accordingly, comparator 8 gives PWM circuit 14 chopper signal 17 through inverter 32 to turn MOSFETs 1 and 2 through drive circuit 10. In another aspect, when comparator 8 produces the output of low voltage level as mentioned above, electric current flows from first reference voltage generator 34 through resistors 26, 28 and diode 30 to output terminal of comparator 8 to apply a second reference voltage $V_{r2}$ divided from first reference voltage $V_{r1}$ by resistors 26 and 28 to the other input terminal (+) of comparator 8. This function ensures that comparator 8 has the hysteretic property by applying changed or different first and second reference voltages $V_{r1}$ and $V_{r2}$ on the other input terminal (+) of comparator 8. When detection voltage on current detecting resistor 4 becomes lower than second reference voltage $V_{r2}$, comparator 8 changes the output from low to high voltage level.

In driving the stepping motor driver of two phases, control circuit 12 produces operation signals to drive circuit 10, and simultaneously PWM circuit 14 forwards drive signals to MOSFETs 1 and 2 through drive circuit 10 to alternately turn MOSFETs 1 and 2 on and off. FIG. 2(A) and (B) represent waveforms of output voltage from PWM circuit 14 and gate voltage on MOSFET 1. When MOSFET 1 is turned on, MOSFET 2 is turned off, and adversely, when MOSFET 1 is turned off, MOSFET 2 is turned on. Specifically, when MOSFET 1 is turned on, excitation current $I_1$ flows through corresponding winding 21 to accumulate electric energy in winding 21. As understood from FIG. 2(D), excitation current $I_1$ increases with elapsed time, and comparator 8 changes the output from high to low voltage level as chopper signal 17 when detection voltage on current detecting resistor 4 exceeds first reference voltage $V_{r1}$ from first reference voltage generator 34. Thus, chopper signal 17 is sent to NOR gate 18 and to PWM circuit 14 through inverter 32, and concurrently PWM circuit 14 changes the output to drive circuit 10 to low voltage level to cease drive signal to MOSFET 1 to turn it off. When MOSFET 1 is switched off, regenerative current $I_2$ flows from ground through current detecting resistor 4, parasitic diode $2a$ of mating MOSFET 2 in the bifilar turn arrangement to DC power source 20 to discharge electric energy in winding 21. Regenerative current $I_2$ produces on current detecting resistor 4 negative detection voltage which is also applied on one input terminal (−) of comparator 8.

When comparator 8 produces chopper signal 17 of low voltage level, electric current flows from first reference voltage generator 34 through resistors 26 and 28 and diode 30 to output terminal of comparator 8 to change the input signal to the other input terminal (+) thereof from first reference voltage $V_{r1}$ to second reference voltage $V_{r2}$ divided from first reference voltage $V_{r1}$ by resistors 26 and 28. Negative detection voltage on one input terminal (−) of comparator 8 is lower than second reference voltage $V_{r2}$ applied on the other input terminal (+) of comparator 8 which therefore immediately ceases chopper signal 17 of low voltage level, and instead, produces the output of high voltage level. In this case, chopper signal 17 as an alarm signal has the very short span of pulse. FIG. 2(G) indicates fluctuation in input $V_A$ voltage applied on the other input terminal (+) of comparator 8 as indicated by an instantaneous pulse $V_{A1}$ of low level which initially changes from first reference voltage $V_{r1}$ to second reference voltage $V_{r2}$, and then returns from second reference voltage $V_{r2}$ to first reference voltage $V_{r1}$. Synchronously, FIG. 2(H) shows that comparator 8 instantaneously produces chopper signal 17 of low voltage level in response to instantaneous $V_{A1}$ of input $V_A$ voltage to comparator 8. PWM circuit 14 changes the output signal from high to low voltage level supplied to one input terminal of NOR gate 18 with delay time T shown in FIG. 2(I) through retardant circuit 16. Accordingly, although momentary chopper signal 17 of low voltage level is conveyed to one input terminal of NOR gate 18, retardant circuit 16 keeps the output of high voltage level so that NOR gate 18 produces no output as shown in FIG. 2(J). In this way, RSFF 24 is not set through OR gate 23 and never produces the output. The stepping motor driver is operated as mentioned above in case there is no disconnection in mating winding 22, and similar operation takes place without disconnection in the other winding 21. Accordingly, during the off period of MOSFET 1 or 2, regenerative current $I_2$ flows through current detecting resistor 4 to apply negative voltage on resistor 4, and thereby comparator 8 produces transient chopper signal 17 of low voltage level after MOSFET 1 or 2 is turned off, and then returns without delay to the output of high voltage level as shown in FIG. 2(H).

For example, if any disconnection occurs in mating winding 22 in the bifilar turn arrangement, electric energy accumulated in winding 21 produces high flyback voltage in winding 21 when MOSFET 1 is turned off, and flyback voltage superimposed on supply voltage from DC power source 20 is applied on MOSFET 1, but regenerative current $I_2$ does not flow through mating winding 22. At the time flyback voltage reaches avalanche breakdown voltage of MOSFET 1, regenerative current 13 flows from winding 21 through MOSFET 1 even in the off mode and current detecting resistor 4 to ground while flyback voltage is kept clamped at the avalanche breakdown voltage so that regenerative current 13 produces positive detection voltage on current detecting resistor 4. Here, regenerative current 13 indicates the gradually reducing slope characteristics as shown by slanted lines of FIG. 2(D). Likewise, detection voltage 15 applied on current detecting resistor 4 indicates the gradually decreasing slope characteristics as shown by slanted lines of FIG. 2(F), and regenerative current 13 and detection voltage 15 do not indicate rapid drop characteristics unlike the normal condition. Under this situation, positive detection voltage 15 on current detecting resistor 4 is higher than second reference voltage $V_{r2}$, and applied on one input terminal (−) of comparator 8 which therefore produces chopper signal 17 of considerable time span $T_1$ as shown in FIG. 2(H) because positive detection voltage 15 lasts for a relatively long period of time while comparator 8 compares detection voltage on current detecting resistor 4 and second reference voltage $V_{r2}$. Comparator 8 still continues output of chopper signal 17 even after the output from PWM circuit 14 delayed by retardant circuit 16 is turned to low level as shown in FIG. 2(I). NOR gate 18 simultaneously receives chopper signal 17 from comparator 8 and delayed output from retardant circuit 16 to generate the output shown in FIG. 2(J) to set terminal of RSFF 24 through OR gate 23 to set RSFF 24. Thus, as shown in FIG. 2(K), RSFF 24 produces the output to input terminal I of control circuit 12 which therefore ceases operation signals to drive circuit 10. RSFF 24 is returned to the original condition when an extra reset signal is applied to a reset terminal R through a port 38 of driving circuit 3. In this way, comparator 8 provides a voltage comparator which compares detection voltage on current detecting resistor 4 with second reference voltage $V_{r2}$ to produce the output of chopper signal 17 when detection voltage is higher than second reference voltage $V_{r2}$, and the other hand, NOR gate 18 provides a disconnection detector which produces disconnection detecting signal when receives simultaneously chopper signal 17 and delayed output of low voltage level from comparator 8 as decision circuit.

Figure 3:
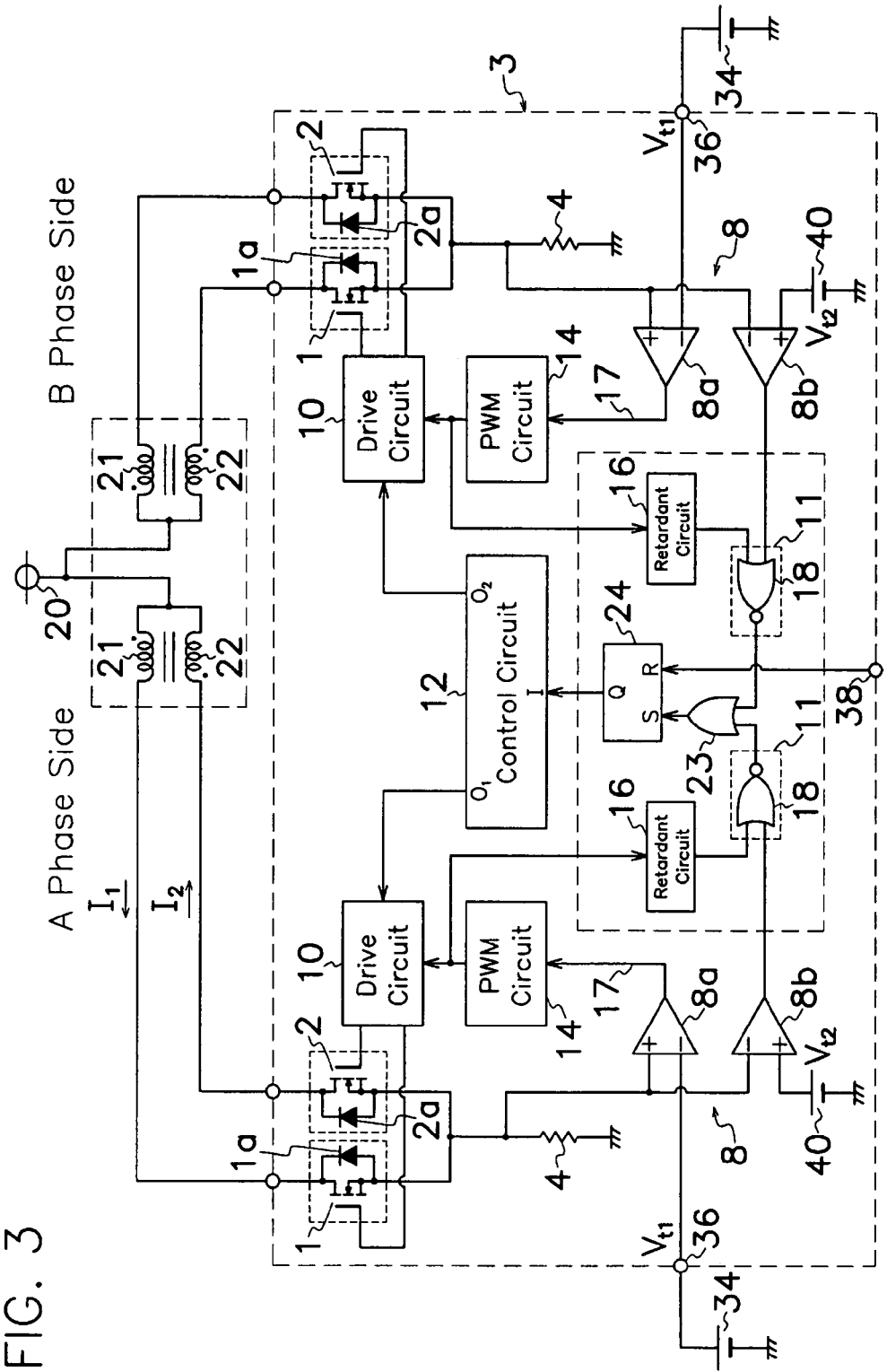
FIG. 3 is an electric circuit diagram showing a second embodiment of the device for detecting disconnection in stepping motor driver according to the present invention.
Figure 4:
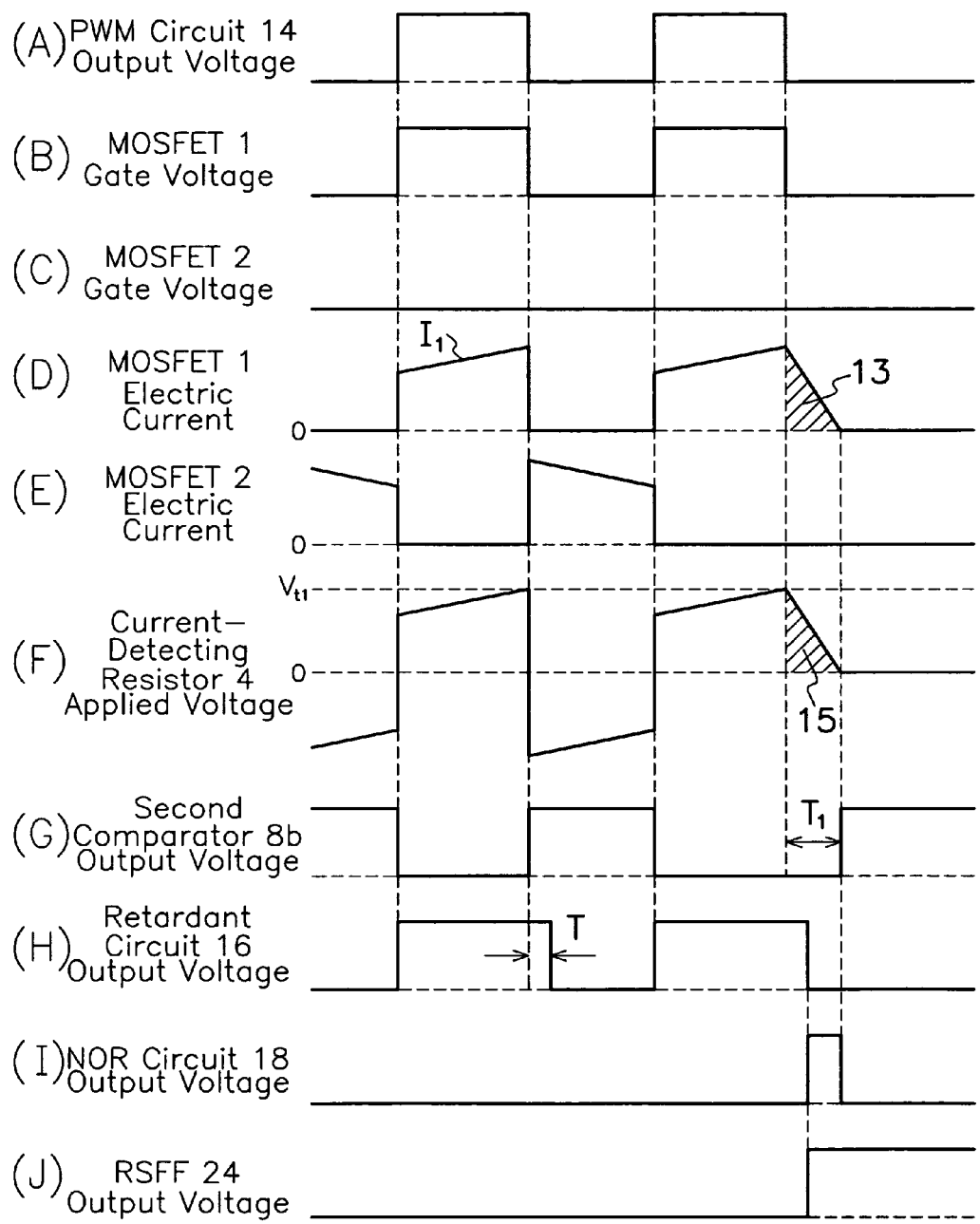
FIG. 4 is a wave form diagram of electric signals produced through circuit electric elements shown in FIG. 3.

FIG. 3 illustrates a second embodiment of the present invention having a comparator 8 which comprises a first comparator 8a for producing a chopper signal 17 to PWM circuit 14 when detection voltage on current detecting resistor 4 is equal to or exceeds first reference voltage $V_{r1}$, a second comparator 8b for producing the output when detection voltage on current detection resistor 4 is lower than second reference voltage $V_{r2}$ and a second reference voltage generator 40 for producing a second reference voltage $V_{r2}$ lower than first reference voltage $V_{r1}$. Second comparator 8b provides a decision circuit for producing the output to NOR gate 18 when detection voltage on current detecting resistor 4 is higher than second reference voltage $V_{r2}$. Basic components other than those mentioned above are similar to those shown in FIG. 1.

In operating the stepping motor driver shown in FIG. 3, for example, MOSFET 1 is turned on to cause excitation current $I_1$ to flow through corresponding winding 21 for accumulation of electric energy in winding 21. As shown in FIG. 4(D), excitation current $I_1$ through winding 21 increases as time passes, and first comparator 8a changes the output from low voltage level to chopper signal (not shown) of high voltage level to PWM circuit 14 which therefore switches the output to low voltage level to drive circuit 10 to cease drive signal to MOSFET 1. As a result, MOSFET 1 is turned off, and regenerative current $I_2$ flows from ground through current detecting resistor 4, parasitic diode 2a of mating MOSFET 2 and mating winding 22 to DC power source 20 to store electric energy in winding 21. Regenerative current $I_2$ produces on current detecting resistor 4 negative detection voltage which also is applied to one input terminal (−) of second comparator 8b. Since detection voltage is lower than second reference voltage $V_{r2}$ of second reference generator 40 applied to the other input terminal (+), second comparator 8b produces the output of high voltage level shown in FIG. 4(G) to one input terminal of NOR gate 18. At the moment, as NOR gate 18 receives at one input terminal the output of high voltage level from second comparator 8b and at the other input terminal the output of high voltage level from PWM circuit 14 through retardant circuit 16, NOR gate 18 never produces disconnection detection signal. The above-mentioned processes are repeated when mating winding 22 has no disconnection, and similar operation is carried out without disconnection in the other winding 21. Accordingly, during the off period of MOSFET 1 or 2, regenerative current $I_2$ flows through current detecting resistor 4 to apply negative voltage on resistor 4, and thereby second comparator 8 produces the output of high voltage level after MOSFET 1 or 2 is turned off.

For instance, if any disconnection happens in mating winding 22 in the bifilar turn arrangement, electric energy accumulated in winding 21 produces high flyback voltage in winding 21 when MOSFET 1 is turned off, and flyback voltage superimposed on supply voltage from DC power source 20 is applied on MOSFET 1, but regenerative current $I_2$ does not flow through mating winding 22. At the time flyback voltage reaches avalanche breakdown voltage of MOSFET 1, regenerative current 13 flows from winding 21 through MOSFET 1 even in the off mode and current detecting resistor 4 to ground while flyback voltage is kept clamped at the avalanche breakdown voltage so that regenerative current 13 produces positive detection voltage on current detecting resistor 4. Here, regenerative current 13 through MOSFET 1 and detection voltage 15 on current detecting resistor 4 indicate their gradually reducing slope characteristics as shown by slanted lines of FIGS. 4(D) and 4(F) without rapid drop characteristics. In comparing detection voltage from current detecting resistor 4 and applied to one input terminal (−) of second comparator 8b with second reference voltage $V_{r2}$ applied to the other input terminal (+) of second comparator 8b, positive detection voltage from current detecting resistor 4 is higher than second reference voltage $V_{r2}$, and second comparator 8b keeps the output on low voltage level for a considerably period of time $T_1$ as shown in FIG. 4(G), and does not change the output to high voltage level. When output from PWM circuit 14 supplied to one input terminal of NOR gate 18 through retardant circuit 16 changes from high to low voltage level as shown in FIG. 4(H), output from second comparator 8b as an alarm signal remains in low voltage level as shown in FIG. 4(G), and therefore, NOR gate 18 produces the output to set terminal S of RSFF 24 through OR gate 23 to set RSFF 24. As a result, RSFF 24 produces the output shown in FIG. 4(J) to input terminal I of control circuit 12 thereby causing control circuit 12 to stop transmission of operation signal to drive circuit 10. RSFF 24 is returned or reset to the original state when an extra reset signal is applied to reset terminal R through port 38. In this way, second comparator 8b provides a decision circuit which compares detection voltage on current detecting resistor 4 with second reference voltage $V_{r2}$ to produce the output when detection voltage is higher than second reference voltage $V_{r2}$, and the other hand, NOR gate 18 provides a disconnection detector 11 which produces disconnection detecting signal when receives the outputs of low voltage level from first and second comparators 8a and 8b at the same time.

Figure 5:
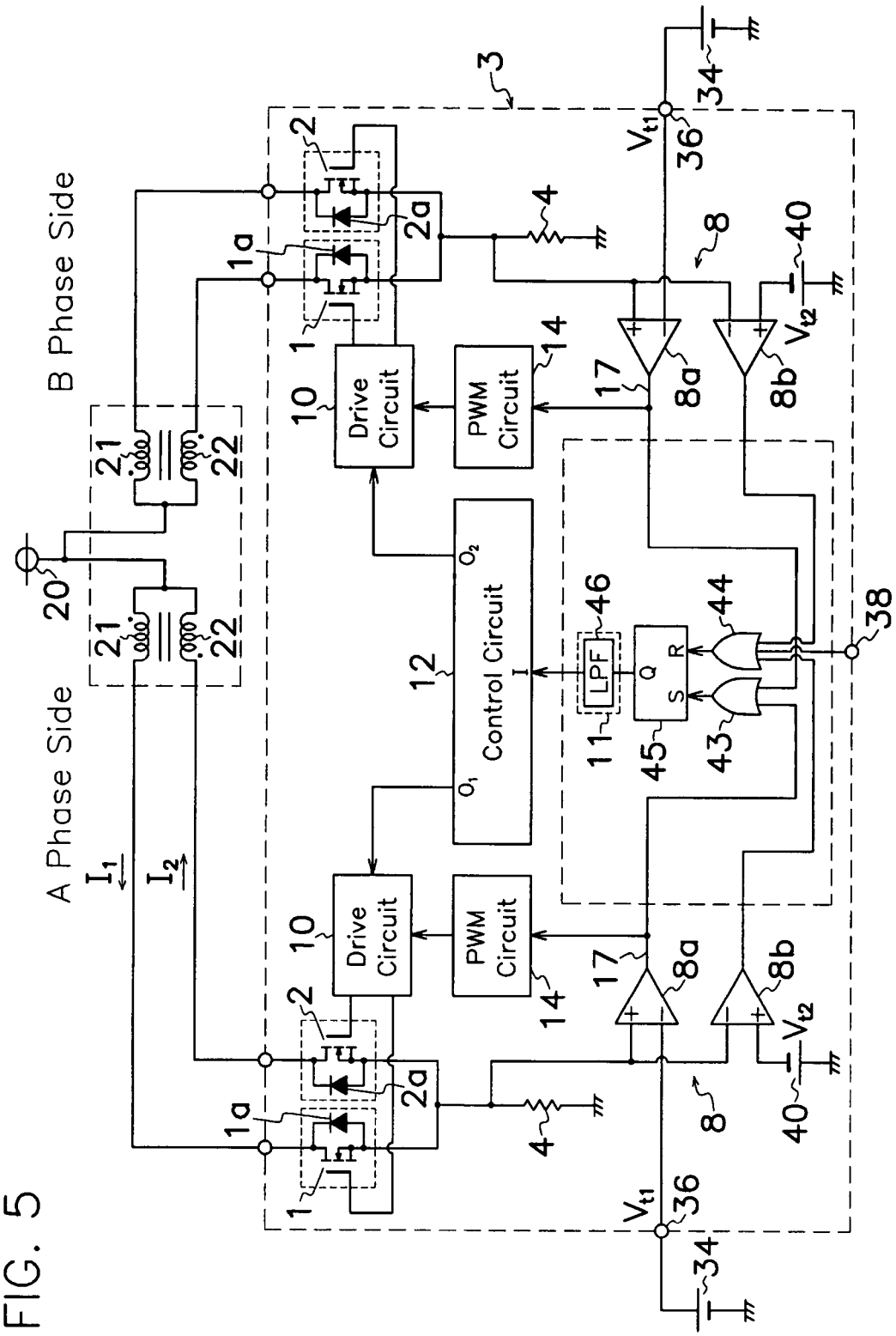
FIG. 5 is an electric circuit diagram showing a third embodiment of the device for detecting disconnection in stepping motor driver according to the present invention.
Figure 6:
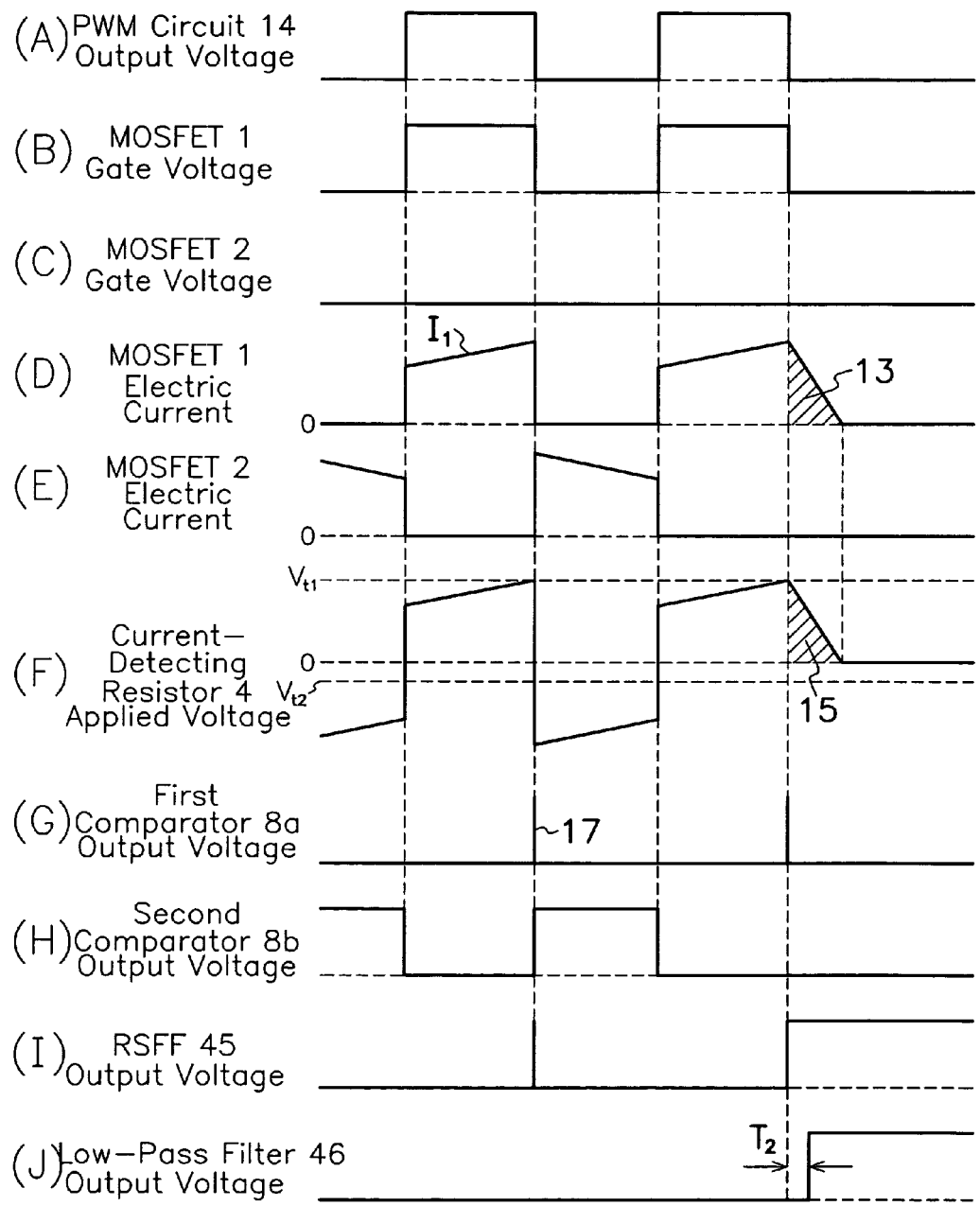
FIG. 6 is a wave form diagram of electric signals produced through circuit electric elements shown in FIG. 5.
Figure 7:
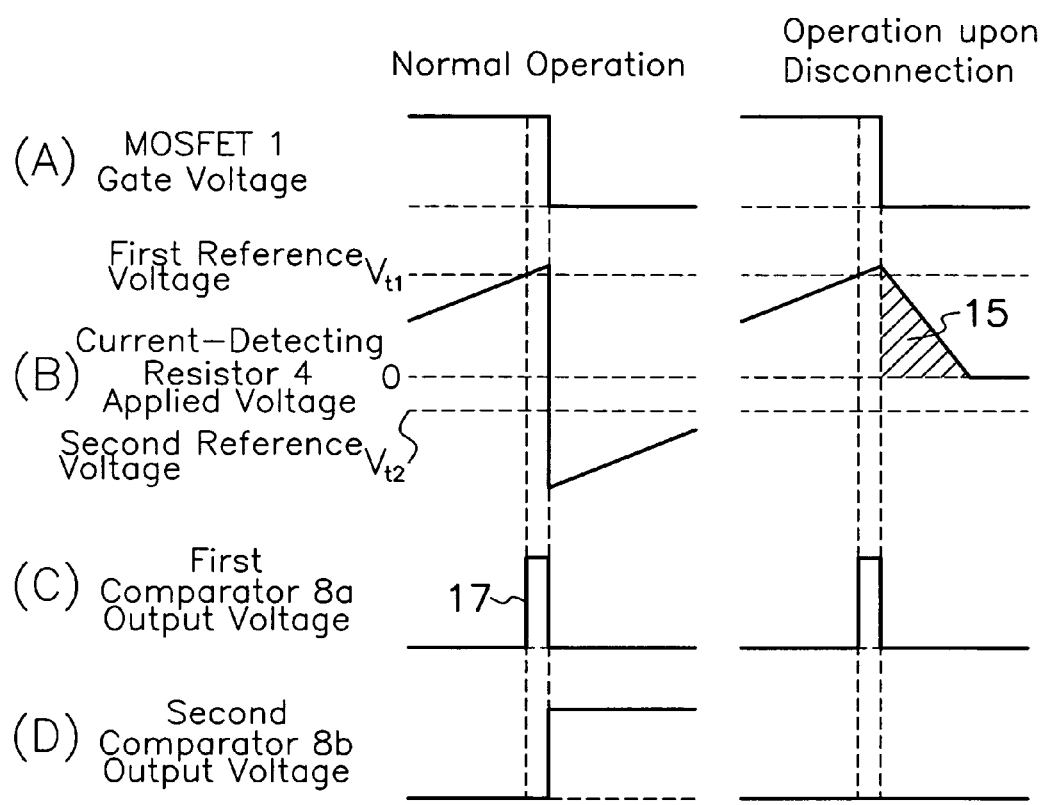
FIG. 7 is a detailed wave form diagram of electric signals produced through circuit electric elements shown in FIG. 5.

FIG. 5 represents a third embodiment according to the present invention without retardant circuit. As shown in FIG. 5, output terminal of first comparator 8a is connected to PWM circuit 14 and OR gate 43, and output terminal of OR gate 43 is connected to set terminal S of RSFF 45 used as a retaining circuit for maintaining the set condition after receiving a set signal at set terminal S. Output terminal of second comparator 8b is connected to an input terminal of OR gate 44, and output terminal of OR gate 44 is connected to reset terminal R of RSFF 45 for producing an alarm signal. Output terminal of RSFF 45 is connected to input terminal I of control circuit 12 through low-pass filter 46 as a disconnection detector 11.

In operating the stepping motor driver shown in FIG. 5, for example, MOSFET 1 is turned on to cause excitation current $I_1$ to flow through corresponding winding 21 for accumulation of electric energy in winding 21. As shown in FIG. 6(D), excitation current $I_1$ through winding 21 increases as time passes, and when detection voltage on current detecting resistor 4 exceeds first reference voltage $V_{r1}$ from first reference voltage generator 34 as shown in FIG. 7(B), first comparator 8a produces a chopper signal 17 shown in FIG. 7(C) to PWM circuit 14 and OR gate 43. Accordingly, PWM circuit 14 switches the output to drive circuit 10 from high to low voltage level to cease drive signals to MOSFET 1. At the same time, OR gate 43 forwards the output to set terminal S of RSFF 45 which therefore is turned to the set condition to provide low-pass filter 46 with alarm signal, however, low-pass filter 46 filtrates and prevents passage of alarm signal of short pulse width toward control circuit 12.

When MOSFET 1 is turned off, regenerative current $I_2$ flows from ground through current detecting resistor 4, parasitic diode 2a of mating MOSFET 2 and mating winding 22 to DC power source 20 to discharge electric energy in winding 21. Regenerative current $I_2$ causes detection voltage on current detecting resistor 4 to rapidly decrease to a negative level lower than second reference voltage $V_{r2}$ as shown in FIGS. 6(F) and 7(B), and first comparator 8a immediately drops chopper signal 17 to low voltage level as shown in FIGS. 6(G) and 7(C). At the same time, second comparator 8b compares detection voltage with second reference voltage $V_{r2}$ from second reference voltage generator 40 negatively biased and produces the output of high voltage level as shown in FIGS. 6(H) and 7(D). Output of high voltage level from second comparator 8b is applied to reset terminal R of RSFF 45 through OR gate 44 to reset RSFF 45 and thereby cease alarm signal to low-pass filter 46. After RSFF 45 is set by chopper signal 17 shown in FIG. 7(C) from first comparator 8a until RSFF 45 is reset by output from second comparator 8b, low-pass filter 46 filtrates alarm signal to RSFF 45. Without disconnection in winding 22, RSFF 45 is reset within a short period of time by output from second comparator 8b, and RSFF 45 produces alarm signal of extremely short pulse span as shown in FIG. 6(I). Therefore, low-pass filter 46 removes alarm signal to stop passage of disconnection detection signal through low-pass filter 46 as shown in FIG. 6(J).

When any cutoff occurs in mating winding 22 and MOSFET 1 is turned off, electric energy accumulated in winding 21 produces in winding 21 high flyback voltage which is applied on MOSFET 1 in the superimposed condition on supply voltage from DC power source 20, however, no regenerative current $I_2$ flows through mating winding 22 in the bifilar winding relation. When flyback voltage comes up to avalanche breakdown voltage of MOSFET 1, it is clamped on that voltage, and regenerative current 13 shown in FIG. 6(D) flows from winding 21 through MOSFET 1 even in the off mode and current detecting resistor 4 to ground to produce positive detection voltage 15 on current detecting resistor 4 as shown in FIG. 6(F). In other words, as shown in FIG. 7(B), positive detection voltage 15 on current detecting resistor 4 indicates the gradually reducing slope characteristics after it exceeds first reference voltage $V_{r1}$. Accordingly, as shown in FIG. 7(C), first comparator 8a forwards chopper signal 17 to PWM circuit 14 and RSFF 45 through OR gate 43 to cease drive signal to MOSFET 1 and set RSFF 45. Detection voltage on current detecting resistor 4, however, does not exceed second reference voltage $V_{r2}$ as shown in FIG. 7(B), second comparator 8b does not produce the output as shown in FIG. 7(D). Thus, RSFF 45 is not reset and continues to produce alarm signal of high voltage level as shown in FIG. 6(I). Therefore, low-pass filter 46 receives an input signal whose pulse span is longer than time width $T_2$ to provide disconnection detection signal for input terminal I of control circuit 12 which stops operation of drive circuit 3. In this way, second comparator 8b provides a decision circuit for comparing detection voltage on current detecting resistor 4 with second reference voltage $V_{r2}$ to produce the output when detection voltage is higher than second reference voltage $V_{r2}$, and low-pass filter 46 provides a disconnection detector 11 for producing disconnection detecting signal when RSFF 45 is not reset by output from the decision circuit within a considerable period of time after first comparator 8a produces chopper signal 17.

Figure 8:
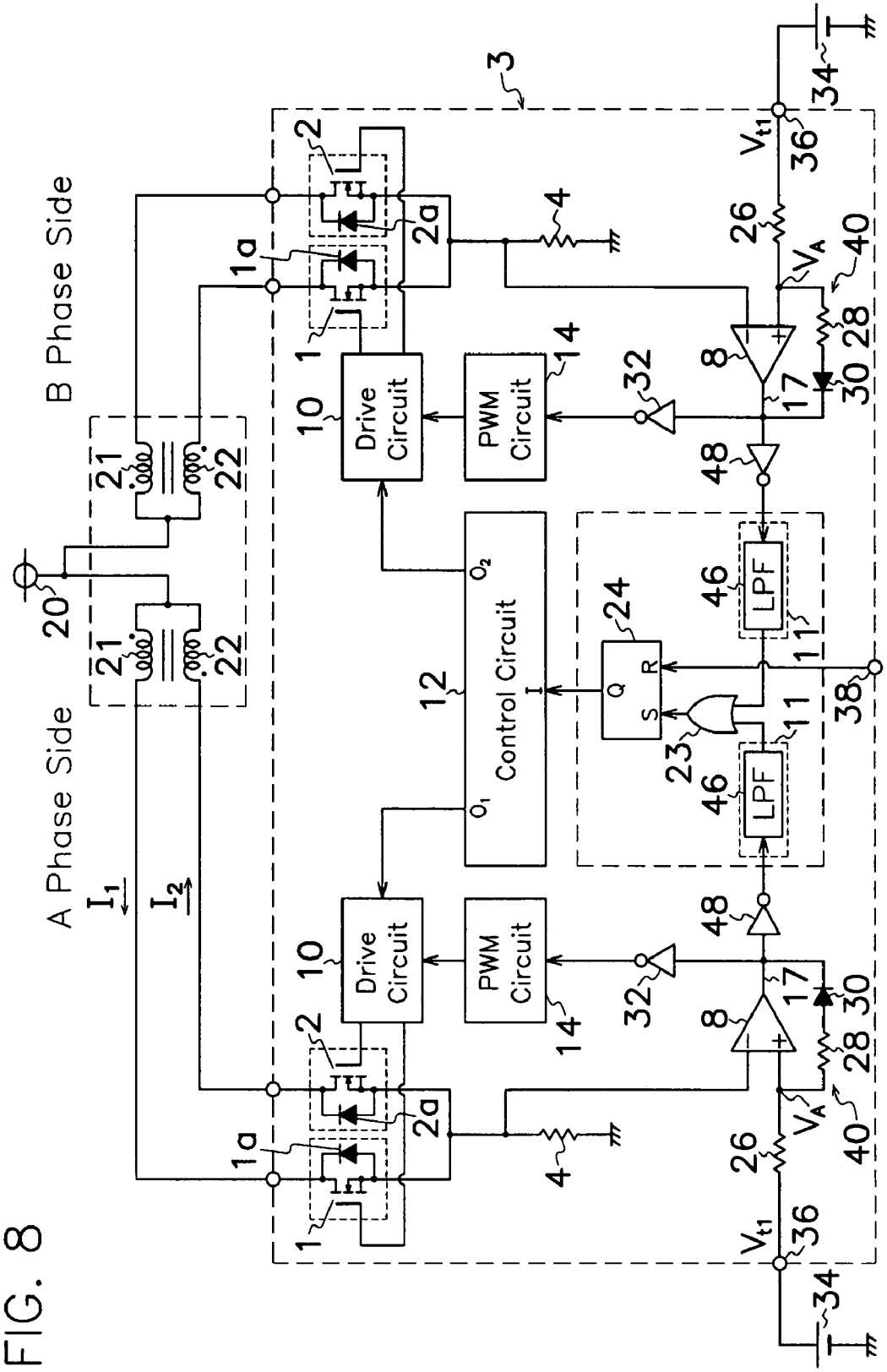
FIG. 8 is an electric circuit diagram showing a fourth embodiment of the device for detecting disconnection in stepping motor driver according to the present invention.
Figure 9:
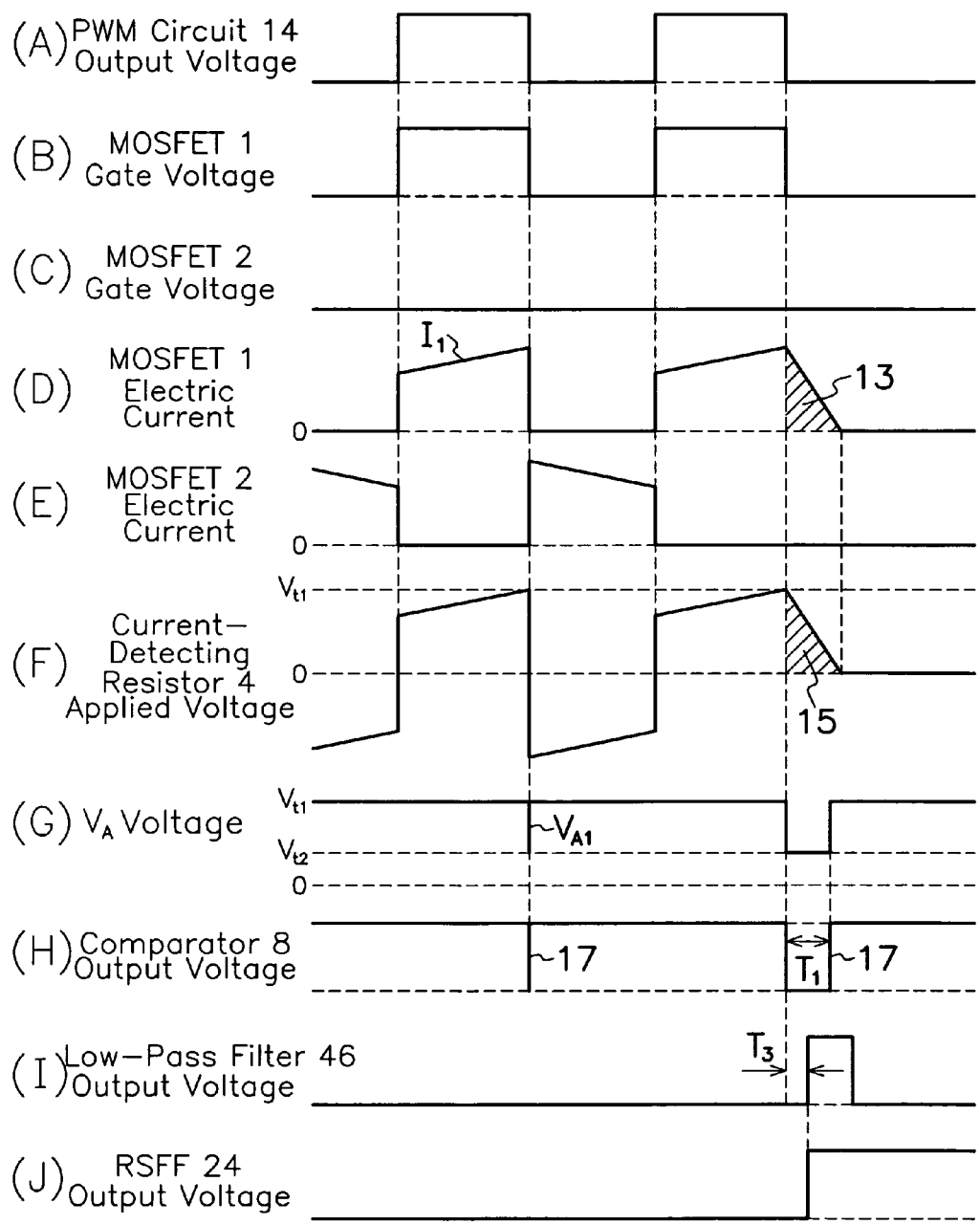
FIG. 9 is a wave form diagram of electric signals produced in circuit electric elements shown in FIG. 8.

FIG. 8 shows a fourth embodiment according to the present invention utilizing a comparator 8 associated with a hysteretic property. Comparator 8 in FIG. 8 is similar in construction to those in FIG. 1 except in that output terminal of each comparator 8 is connected to PWM circuit 14 through an inverter 32 and to set terminal of RSFF 24 through an inverter 48, low-pass filter 46 as a disconnection detector 11 and OR gate 23. When MOSFET 1 is turned on, excitation current $I_1$ flows from DC power source 20 through winding 21, MOSFET 1 and current detecting resistor 4 to ground. As excitation current $I_1$ increases with passage of time as shown in FIG. 9(D), detection voltage on current detecting resistor 4 increases accordingly. When detection voltage exceeds first reference voltage $V_{r1}$ as shown in FIG. 9(F), comparator 8 produces a chopper signal 17 of low voltage level to inverters 32 and 48 which, therefore, transmit signals of high voltage level to PWM circuit 14 and low-pass filter 46. PWM circuit 14 switches the output to drive circuit 10 from high to low voltage level to cease drive signal to MOSFET 1. During the normal operation, after MOSFET 1 is turned off, regenerative current $I_2$ flows through current detecting resistor 4 to instantly convert detection voltage thereon into the negative level as shown in FIG. 9(F). When comparator 8 produces chopper signal 17 of low voltage level, input signal received by the other input terminal (+) of comparator 8 is automatically switched from first reference voltage $V_{r1}$ to second reference voltage $V_{r2}$ as above-described to compare detection voltage with second reference voltage $V_{r2}$ by comparator 8. FIG. 9(G) indicates a momentary pulse $V_{A1}$ of low voltage level formed by voltage $V_A$ which initially drops from first reference voltage $V_{r1}$ to second reference voltage $V_{r2}$ and then immediately returns from $V_{r2}$ to $V_{r1}$. FIG. 9(H) shows chopper signals 17 of low voltage level as alarm signals instantaneously produced by comparator 8 synchronously in response to momentary pulse $V_{A1}$. When detection voltage on current detecting resistor 4 is switched to a negative value lower than second reference voltage $V_{r2}$ after MOSFET 1 is turned off, comparator 8 changes the output from low to high voltage level like a flash, and therefore, low-pass filter 46 which integrates the output from inverter 48, does not produce the output, cutting input signals of short pulse width. Upon occurrence of disconnection in winding 22, detection voltage 15 on current detecting resistor 4 represents the slope characteristics shown in FIG. 9(F). Accordingly, as detection voltage 15 is above second reference voltage $V_{r2}$, comparator 8 continues to produce alarm signal 17 of low voltage level for a considerable period $T_1$ of time. Then, as shown in FIG. 9(I), low-pass filter 46 generates the output of pulse width $T_1$ time $T_3$ late to set RSFF 24 through OR gate 23. This ensures that RSFF 24 provides input terminal I of control circuit 12 with disconnection detection signal as shown in FIG. 9(J).

Figure 10:
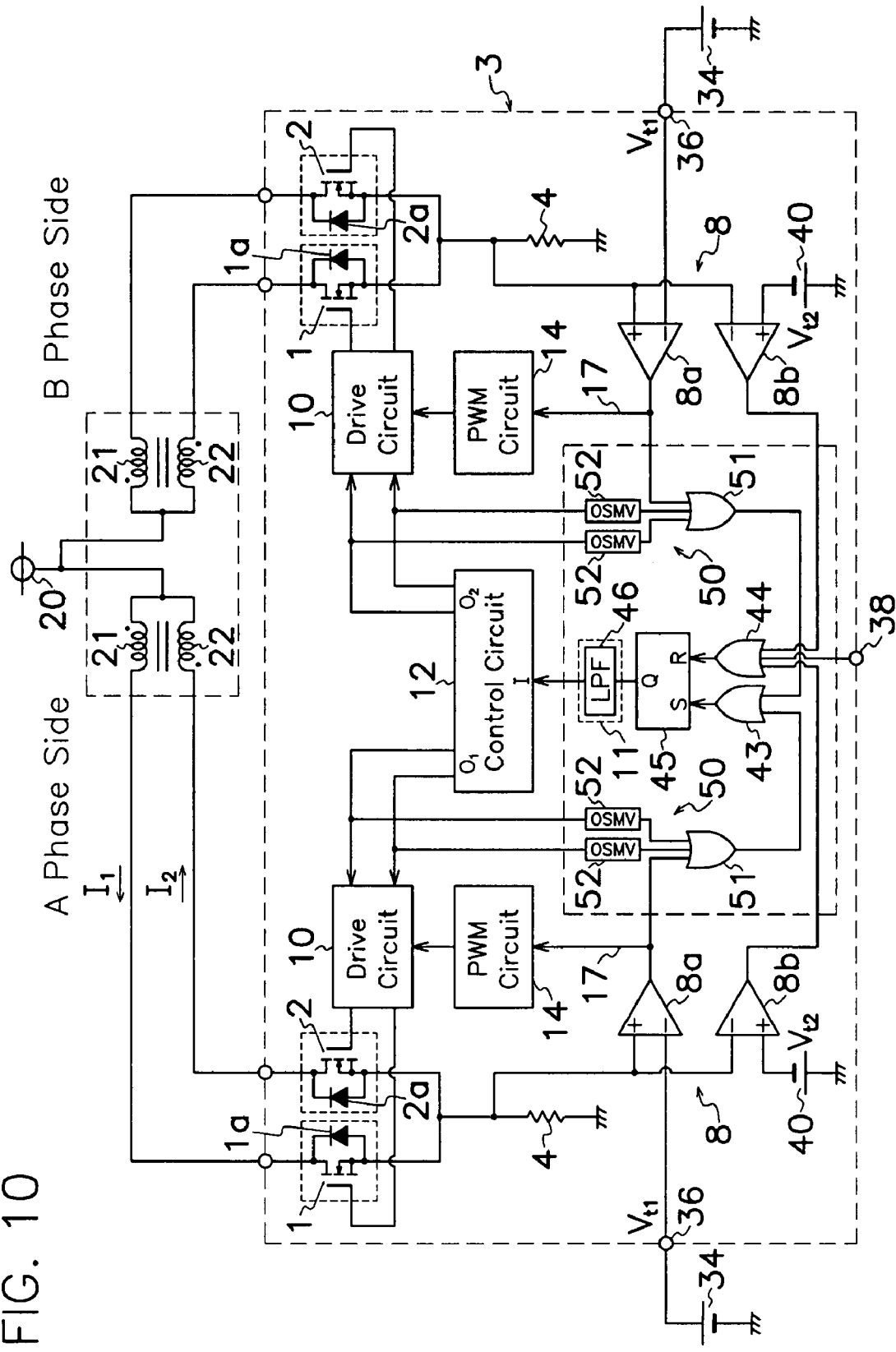
FIG. 10 is an electric circuit diagram showing a fifth embodiment of the device for detecting disconnection in stepping motor driver according to the present invention.
Figure 11:
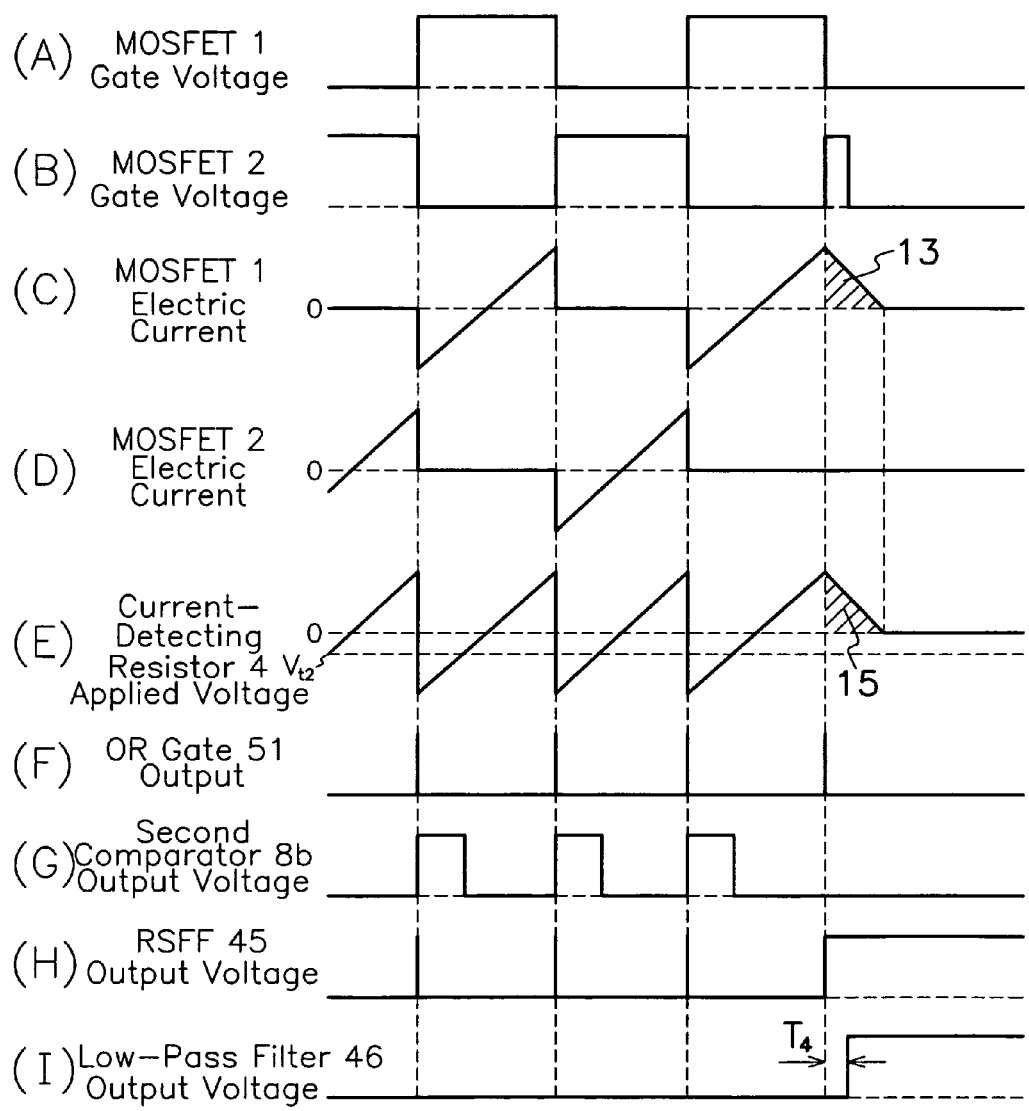
FIG. 11 is a wave form diagram of electric signals produced in circuit electric elements shown in FIG. 10 when the stepping motor is rotated at a high rate.
Figure 12:
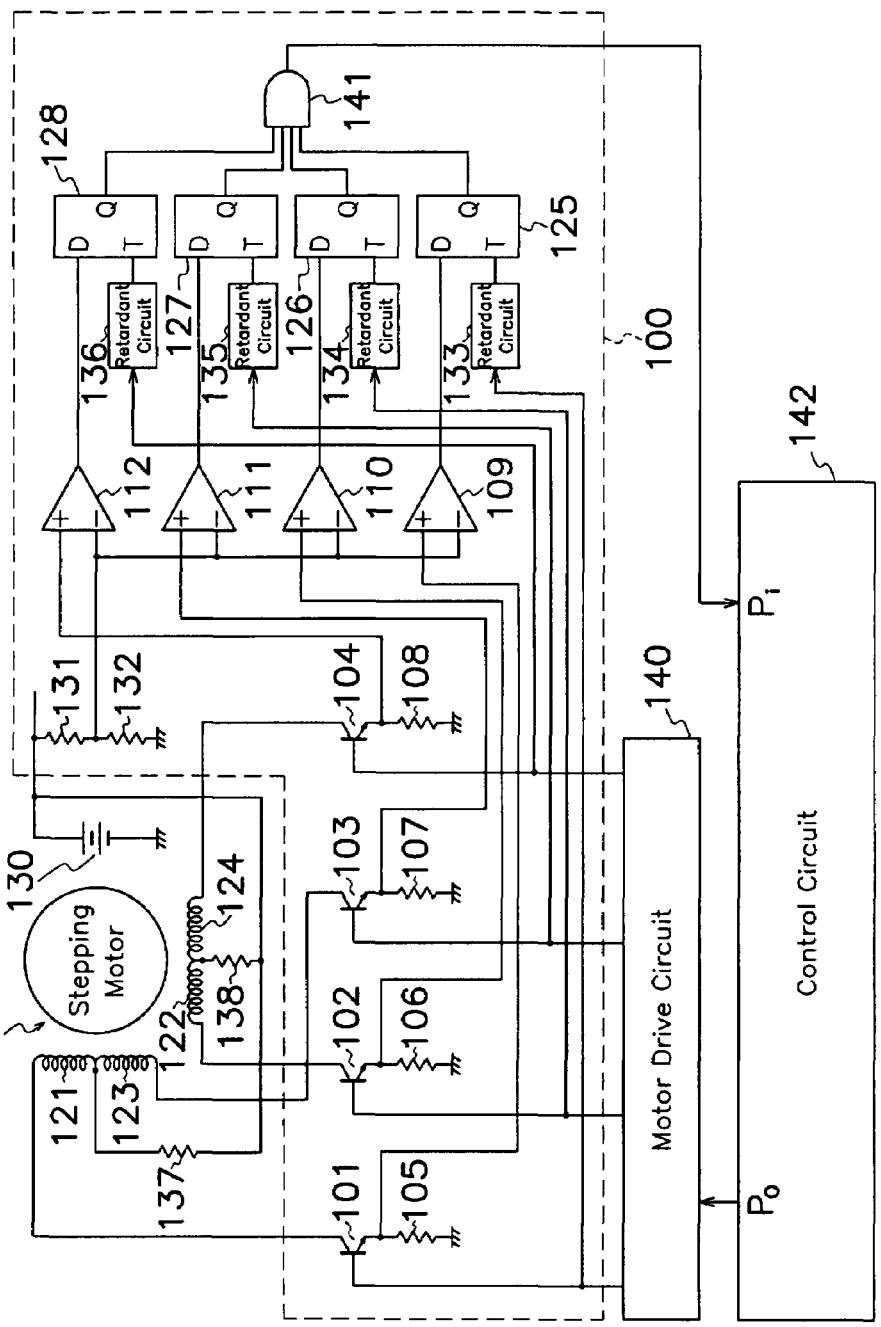
FIG. 12 is an electric circuit diagram showing a prior art stepping motor driver.
Figure 13:
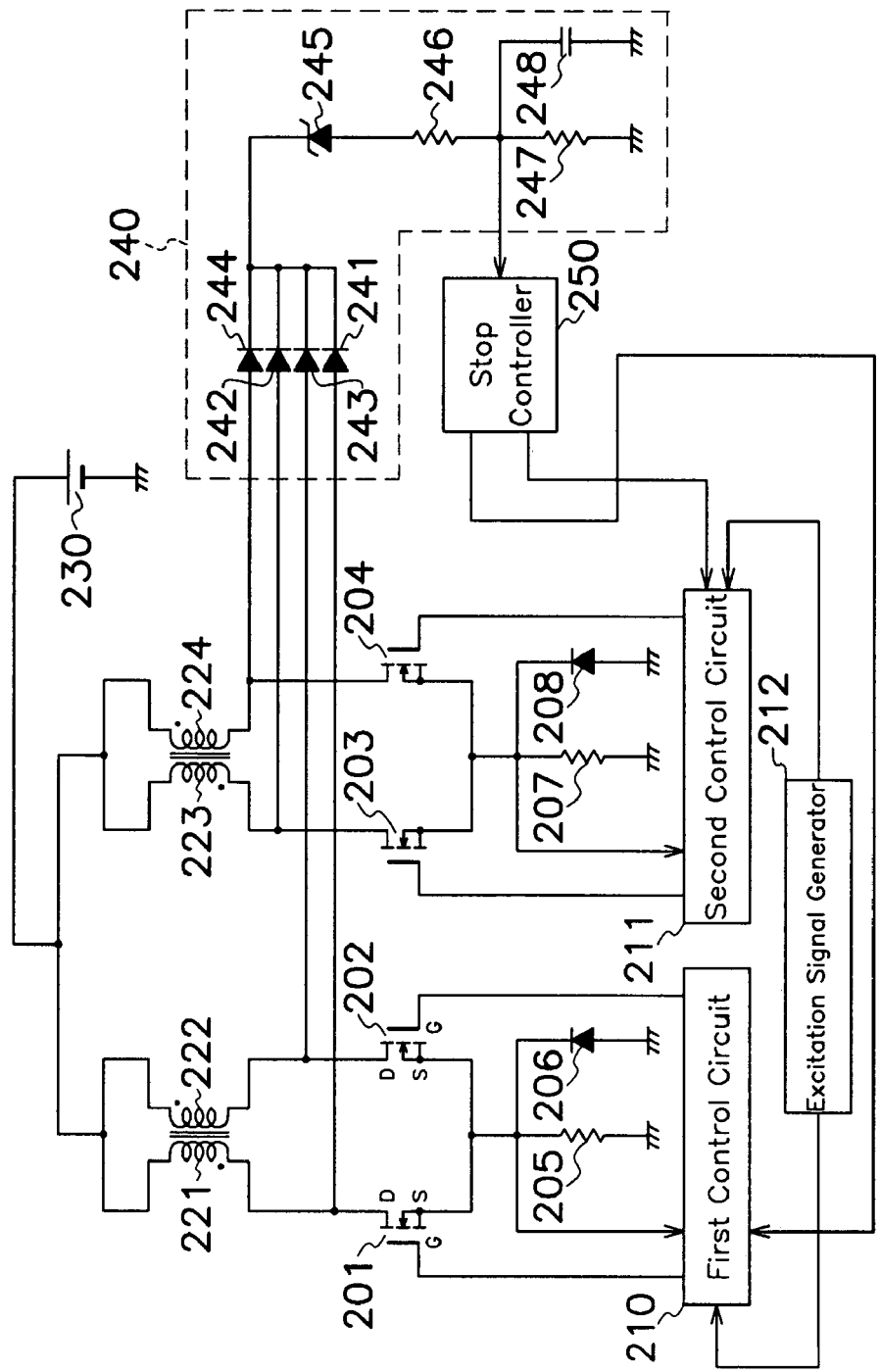
FIG. 13 is an electric circuit diagram showing another prior art stepping motor driver.

When rotation rate of the stepping motor is increased by accelerating the switching rate, the device cannot detect the disconnection in response to chopper drive under PWM control because control circuit 12 furnishes drive circuit 10 with operation signals before detection voltage on current detecting resistor 4 comes up to a predetermined level. Accordingly, it is necessary to certainly detect disconnection in winding 21 or 22 during the rotation of stepping motor at a high rate. FIG. 10 illustrates a fifth embodiment of the present invention which may detect disconnection during the high speed rotation of stepping motor. The driver circuit shown in FIG. 10 comprises a trigger circuit 50 between each output terminal of first comparator 8a and input terminal of OR gate 43. Each trigger circuit 50 comprises a one-shot multivibrator (OSMV) 52 connected in a line between control circuit 12 and drive circuit 10 for producing drive signals to MOSFETs 1 and 2, and an OR gate 51 for supplying input terminal of OR gate 43 with logical sum signal of output signals from OSMV 52 and first comparator 8a.

To detect disconnection in winding 21 or 22 of the stepping motor driven at a normal rotation rate, disconnection detection circuit of FIG. 10 is operated similarly to that shown in FIG. 5, and each electric element in the circuit produces the signal waveform similar to that shown in FIG.

6. When the stepping motor is driven at a high rotation rate, high frequency switching signals shown in FIG. 11(A) and (B) are applied to each gate of MOSFETs 1 and 2 to repeatedly turn MOSFETs 1 and 2 on and off in response to operation signals forwarded from control circuit 12 to drive circuit 10. As mating MOSFET 2 is turned on before regenerative current through parasitic diode 2a has completed to be exhausted after MOSFET 1 is turned off during the high speed rotation, as shown in FIG. 11(D), electric current through MOSFET 2 moves from negative to positive values with the slope determined by inductance of windings 21 and 22. In a similar manner, as MOSFET 1 is turned on before regenerative current through parasitic diode 1a has completed to be exhausted after MOSFET 2 is turned off, electric current through MOSFET 1 similarly moves from negative to positive values with the slope determined by inductance of winding 21 and 22. Accordingly, detection voltage on current detecting resistor 4 during the high speed rotation indicates a serrate waveform which includes a combined feature of upward ramp and rapid fall at the trailing edge of upward ramp as shown in FIG. 11(E). At the moment, trigger circuit 50 is operated to produce a single pulse from OSMV 52 at the time of supplying the trailing edge in drive voltage shown in FIG. 11(A) and (B) to gate terminal of MOSFET 1 or 2, and thereby, OR gate 51 produces pulse array signals shown in FIG. 11(F) to OR gate 43. Each time OR gate produces a pulse to set terminal of RSFF 45, it is set to produce the output to low-pass filter 46 from Q output terminal. When there is no disconnection in winding 21 or 22, detection voltage on current detecting resistor 4 indicates serrate waveform as shown in FIG. 11(E), however, when disconnection occurs in for example winding 22, regenerative current 13 shown in FIG. 11(C) through MOSFET 1 results in ramp detection voltage 15 shown in FIG. 11(E) on current detecting resistor 4. Simultaneously, second comparator 8b does not produce any reset pulse as shown in FIG. 11(G), and RSFF 45 produce the output of long pulse width as shown in FIG. 11(H). Thus, low-pass filter 46 as a disconnection detector produces a disconnection detection signal when low-pass filter 46 receives from RSFF 45 the output longer of time span longer than time $T_4$ before second comparator 8b produces the output. Disconnection detection signal shown in FIG. 11(I) from low-pass filter 46 causes control circuit 12 to stop operation of drive circuit 10.

FIG. 10 shows the example of producing outputs from OSMV synchronously with supplying the trailing edge in drive voltage shown in FIGS. 11(A) and (B) to gate of MOSFET 1 or 2, however, OSMV 52 may produce the outputs synchronously with supplying the leading or rising edge in drive voltage to gate of MOSFET 1 or 2. Also, OSMV 52 may produce the outputs when receives drive signals from drive circuit 10 in lieu of outputs from control circuit 12.

Driver circuit 3 used for the present invention may be formed into an integrated circuit. In this case, driver circuit 3 may be formed into a semiconductor device which has an insulation such as plastic encapsulant for integrally sealing a pair of MOSFETs 1 and 2, current detecting resistor 4 connected between each of MOSFETs 1 and 2 and ground, drive circuit 10 which supplies drive signals to control terminals of MOSFETs 1 and 2, control circuit 12 which provides operation signals for drive circuit 10, PWM circuit 14 which produces pulse-width modulated signals to drive circuit 10, and comparator 8 which forwards chopper signal 17 to PWM circuit 14 to stop operation of drive circuit 10 when detection voltage on current detecting resistor 4 is higher than first reference voltage $V_{r1}$. From outside connected to peripheral terminals of the integrated circuit are electric elements such a pair of windings 21 and 22 and reference voltage generators 34 and 40.

In this way, the disconnection detecting device according to the present invention effectively comprises second reference voltage generator 40 which may produce first reference voltage $V_{r1}$ and second reference voltage $V_{r2}$ lower than first reference voltage $V_{r1}$; decision circuit which compares detection voltage on current detecting resistor 4 with second reference voltage $V_{r2}$ and produces the output when detection voltage is higher than second reference voltage $V_{r2}$; and disconnection detector 11 which produces disconnection detection signal when receives the output from decision circuit after comparator 8 produces the output to easily detect disconnection in winding 21 or 22 with a simplified circuit structure. Also, the present invention enables to produce driver circuit into an integrated circuit without utilizing high-voltage resistive switching elements 1 and 2 and to manufacture the disconnection detection device at low cost.

The foregoing embodiments according to the present invention may be changed in various ways. For example, instead of low-pass filter 46, the driver may comprise an integrating circuit for integrating alarm signal output or counting circuit for accumulating output time of alarm signal, and a comparator for producing a disconnection detection signal when the integrated alarm signal output or accumulated output time is over a predetermined level.

The present invention is preferably applicable to a disconnection detection device in stepping motor driver which has a plurality of windings in the bifilar turn arrangement.

What is claimed are:

1. A device for detecting disconnection for use in a stepping motor driver which comprises at least a pair of windings wound in a bifilar turn arrangement and having each one end connected to a DC power source; a pair of switching elements connected to the other end of each winding; a common current detecting resistor connected between each of said switching elements and ground, a drive circuit for forwarding drive signals to each control terminal of said switching elements; a control circuit for supplying said drive circuit with operation signals; a Pulse Width Modulation circuit for providing said drive circuit with pulse width modulated signals; a first reference voltage generator for producing a first reference voltage; and a comparator for comparing a detection voltage applied on the current detecting resistor with the first reference voltage and providing the Pulse Width Modulation circuit with a chopper signal for turning off the switching element in the on condition when detection voltage is higher than first reference voltage, said device comprising a second reference voltage generator for producing a second reference voltage lower than the first reference voltage;

a decision circuit for comparing the detection voltage on the current detecting resistor with the second reference voltage to produce an alarm signal when the detection voltage is higher than the second reference voltage; and a disconnection detector for receiving the alarm signal from the decision circuit after the comparator produces the chopper signal to produce a disconnection signal when the decision circuit continues to produce the alarm signal even after the switching element in the on condition is turned off, or when said decision circuit produces the alarm signal over a predetermined period of time or when the accumulated value of the alarm signal exceeds a predetermined value after the switching element in the on condition is turned off.

2. The device of claim 1, wherein said comparator comprises one input terminal for receiving the detection voltage from the current detecting resistor and the other input terminal for receiving the first reference voltage, said comparator produces a chopper signal to said Pulse Width Modulation circuit and disconnection detector, said chopper signal causes said second reference voltage to be applied on the other input terminal of said comparator in lieu of said first reference voltage to make said comparator form said decision circuit, said comparator provides said disconnection detector with an alarm signal when detection voltage on said current detecting resistor exceeds said second reference voltage, said disconnection detector produces said disconnection detection signal when receives the alarm signal after the switching element in the on condition is turned off.

3. The device of claim 1, wherein said comparator comprises a first comparator for producing a chopper signal to said Pulse Width Modulation circuit when the detection voltage on said current detecting resistor is higher than said first reference voltage, and a second comparator provides said decision circuit for producing the output to said disconnection detection circuit when the detection voltage on said current detecting resistor is higher than said second reference voltage, said disconnection detector produces said disconnection detection signal when receives the alarm signal from said second comparator after the switching element in the on condition is turned off.

4. The device of claim 1, wherein said comparator comprises a first comparator for producing the chopper signal to said Pulse Width Modulation circuit when the detection voltage on said current detecting resistor is higher than said first reference voltage, a retaining circuit for receiving the chopper signal to produce an alarm signal, a second comparator for forwarding the output to said retaining circuit to stop the output of said retaining circuit when the detection voltage on said current detecting resistor is lower than said first reference voltage after said first comparator produces said chopper signal, and a disconnection detecting circuit for producing said disconnection detection signal when said retaining circuit produces the alarm signal over a predetermined amount or over a predetermined period of time.

5. The device of claim 1, wherein said comparator comprises one input terminal for receiving the detection voltage from the current detecting resistor and the other input terminal for receiving the first reference voltage, said comparator produces the chopper signal to said Pulse Width Modulation circuit and disconnection detector when detection voltage on said current detecting resistor exceeds the first reference voltage, said chopper signal causes said second reference voltage to be applied on the other input terminal of said comparator in lieu of said first reference voltage to make said comparator form said decision circuit, said comparator provides said disconnection detector with an alarm signal when detection voltage on said current detecting resistor exceeds said second reference voltage, said disconnection detector produces said disconnection detection signal when receives the alarm signal when said alarm signal received from said comparator exceeds a predetermined amount or continues to appear over a predetermined period of time.

6. The device of claim 1, wherein a pair of said switching elements, current detecting resistor, drive circuit, control circuit, Pulse Width Modulation circuit and comparator constitute a driver circuit formed into an integrated circuit, electric elements of said windings and reference voltage generators are connected to peripheral terminals of said integrated circuit from outside.

7. A device for detecting disconnection for use in a stepping motor driver which comprises at least a pair of windings wound in a bifilar turn arrangement and having each one end connected to a DC power source; a pair of switching elements connected to the other end of each winding; a drive circuit for forwarding drive signals to each control terminal of said switching elements; a control circuit for supplying said drive circuit with operation signals;

said device comprising a retaining circuit for starting output of an alarm signal upon forwarding a rising or trailing edge in drive signal to switching element, and a disconnection detecting circuit for producing a disconnection detection signal when said alarm signal from said retaining circuit exceeds a predetermined amount or continues to appear over a predetermined period of time.

8. The device of claim 7, further comprising a common current detecting resistor connected between each of said switching elements and ground, a comparator for producing the output when detection voltage on said current detecting resistor is lowered beneath a predetermined level, wherein said retaining circuit is reset by the output from said comparator to cease output of said alarm signal.

9. The device of claim 8, further comprising a Pulse Width Modulation circuit for providing said drive circuit with pulse width modulated signals; and a first reference voltage generator for producing a first reference voltage;

wherein said comparator produces to said Pulse Width Modulation circuit a chopper signal for turning off said switching element in the on condition when said detection voltage on said current detecting resistor is higher than said first reference voltage.

10. The device of claim 9, wherein a pair of said switching elements, current detecting resistor, drive circuit, control circuit, Pulse Width Modulation circuit and comparator constitute a driver circuit formed into an integrated circuit, electric elements of said windings and reference voltage generators are connected to peripheral terminals of said integrated circuit from outside.

* * * * *